April 16, 1957 W. M. SILHAVY 2,789,284
PULSE TRACKING SYSTEM
Filed Feb. 25, 1942 2 Sheets-Sheet 1
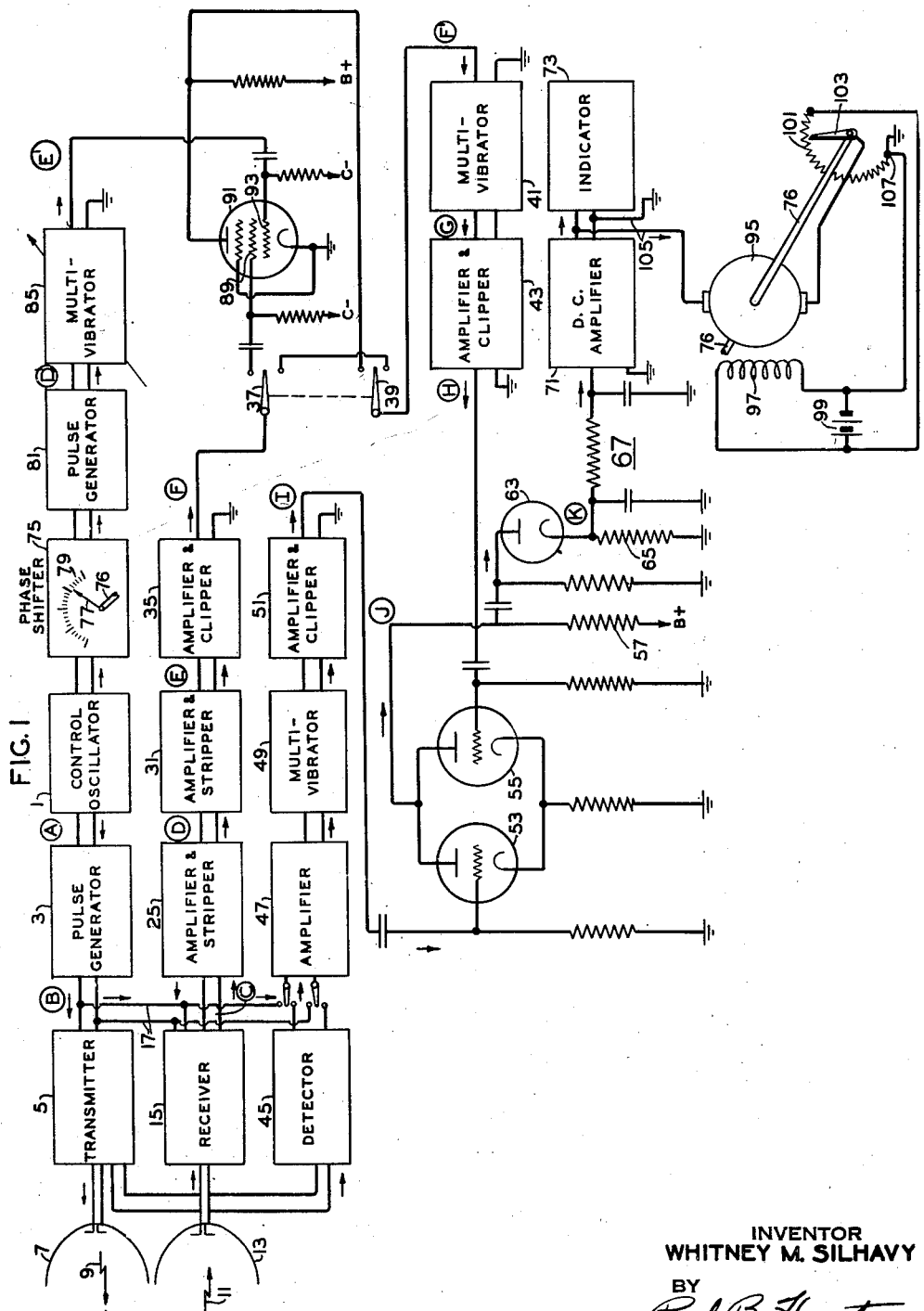
INVENTOR
WHITNEY M. SILHAVY
BY
Paul B. Hunter
ATTORNEY April 16, 1957 W. M. SILHAVY 2,789,284
PULSE TRACKING SYSTEM
Filed Feb. 25, 1942 2 Sheets-Sheet 2
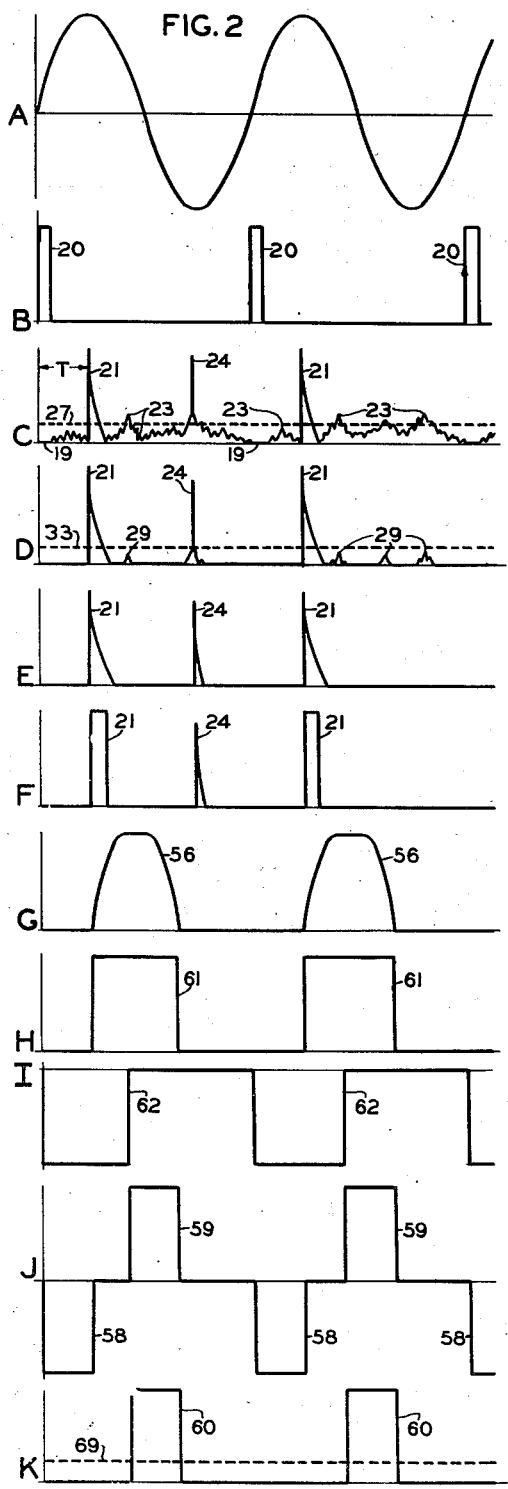
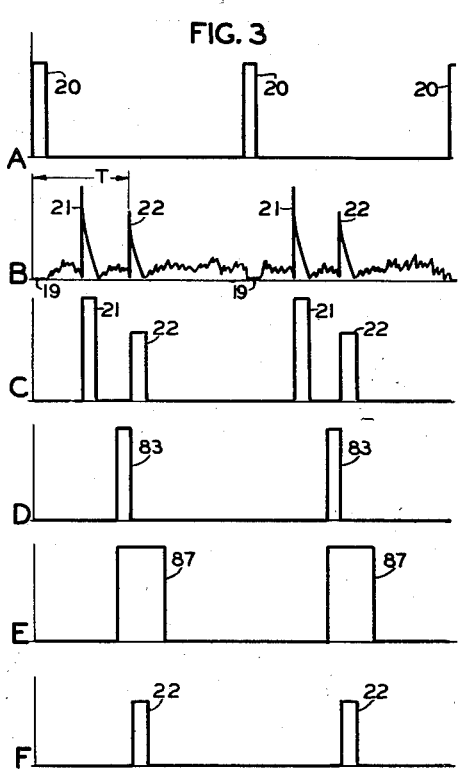
INVENTOR
WHITNEY M. SILHAVY
BY
*Paul B. Hunter*
ATTORNEY

United States Patent Office 2,789,284
Patented Apr. 16, 1957

2,789,284

PULSE TRACKING SYSTEM

Whitney M. Silhavy, Mineola, N. Y., assignor to Sperry Rand Corporation, a corporation of Delaware Application February 25, 1942, Serial No. 432,290

6 Claims. (Cl. 343—7.3)

The present invention is related to the art including distance measuring devices. Such devices may be used as absolute altimeters when installed on aircraft, for determining the exact distance between craft and ground, or may be used for determining the distance to any desired object, as in determining the distance from a fixed station or a surface vessel to an airplane, surface vessel or other object.

The present invention is concerned with a device of this type in which a pulse preferably of supersonic or electrical high frequency energy is periodically transmitted toward the object whose distance is to be measured, and the waves reflected from the object are received and compared with the transmitted wave pulse to indicate the distance of the distant object. In prior devices of this type the received pulse and transmitted pulse were compared directly to obtain the distance indication. However, due to extraneous influences, such as multiple reflections, atmospheric interference, etc., the received pulse may not be well defined under some conditions, and leads to ambiguous or indeterminate indications of distance.

According to the present invention, the received pulse is not used directly but is caused to synchronize a suitable electronic device, such as a multi-vibrator, which thereupon locally generates a voltage pulse which may be compared with a similar pulse derived from a transmitted pulse to give the desired indication. Preferably this local pulse is of fixed amplitude and fixed duration. In this manner, since only the time of arrival and not the amplitude or shape of the received pulse is used, such ambiguous or indeterminate indications are avoided.

Furthermore, in order to minimize "noise" effects and to be able to differentiate between several objects which may be reflecting waves simultaneously, or between multiple-reflected pulses, a pulse "gate" is provided which effectively passes only the pulse corresponding to the desired reflecting object. This gate may be manually set to roughly the position of the chosen received pulse, and thereby indicate an object at that set distance. Means are also provided to cause this "gate" to follow the desired pulse even during changes of distance or range, whereby the gate position may roughly indicate distance.

Accordingly, it is an object of the present invention to provide improved distance measuring devices.

It is another object of the present invention to provide improved distance-measuring devices of the type wherein periodically recurrent pulses of high frequency energy are radiated and reflected from the distant object whose distance is to be measured.

It is still another object of the present invention to provide improved distance-measuring devices of the reflected-pulse type in which the effects of atmospheric interference and stray reflections are minimized or eliminated.

Another object is to provide a direct reading distance-measuring device which is independent of noise.

It is a still further object of the invention to provide an improved distance-measuring device of the reflected-pulse type in which an adjustable gate is provided for minimizing the effect of secondary pulses and atmospheric interference, this gate being automatically adjusted to cooperate with the desired received pulse even during changes of distance.

Further objects and advantages of the present invention will be obvious from the attached specification and drawings, wherein:

Fig. 1 shows a schematic block wiring diagram of a preferred embodiment of the invention.

Fig. 2 shows a time schedule of the wave shapes in various portions of the circuit.

Fig. 3 shows a similar time schedule for different conditions of operation.

Referring to Fig. 1, a suitable source of synchronizing oscillations, such as a synchronizing oscillator 1, is provided for generating a wave of suitable low frequency preferably in the audio frequency range, such as of the order of 2000 cycles. This source of synchronizing oscillations may be of any suitable type, such as a conventional electronic oscillator, vibrator, tuning-fork oscillator or a mechanical alternator, capable of generating a fixed frequency and any desired wave shape. The output of synchronizing oscillating source 1 may have, for example, the wave shape shown in curve A of Fig. 2 and is fed to a synchronizing pulser 3 of any suitable type adapted to preferably produce short pulses of constant amplitude and a repetition rate equal to the frequency of the oscillations from source 1. Such pulses may be of any desired wave shape, but are preferably very short in duration in comparison to their period, preferably of the order of one micro-second in duration. Such pulses are schematically represented by graph B of Fig. 2. These pulses are then applied to a radio or supersonic transmitter 5 of conventional design to modulate the output thereof, whereby there is radiated from a suitable supersonic or electrical high frequency radiator 7 a wave indicated schematically by line 9, and comprising a series of high frequency wave trains with a repetition rate equal to that of the synchronizing pulses and having an envelope similar to that of the synchronizing pulses.

These high frequency pulses, upon being reflected from an object whose distance is to be measured, produce a reflected wave indicated at 11 which is received in a suitable collector or antenna 13 leading to a receiver 15. Receiver 15 may be of any suitable type for receiving the reflected pulses and obtaining from them an electrical signal corresponding to the modulation envelope of the received signal, which may be as shown in graph C of Fig. 2. Preferably also a pulse of the proper width and polarity derived from the synchronizing pulser 3 is connected to receiver 15 as by way of line 17 to effectively blank out or block the receiver 15 during intervals in which transmitter 5 radiates the transmitted pulses, in order that the relatively high intensity of these transmitted pulses shall not have a harmful effect upon the wave shape of the received wave. If the transmitting system is highly directional in character, so that substantially none of the transmitted energy is picked up by the receiver, the blanking pulse may be omitted.

As shown at 19 in Fig. 2C, this results in zero output during the time intervals corresponding to the transmitted pulses. The actual reflected pulse envelope is indicated at 21 in Fig. 2C and ordinarily will no longer have the square wave shape of the transmitted pulse and will be accompanied by many smaller pulses such as 23, due to atmospheric interference and various stray reflections, termed "noise." In order to eliminate the effect of this "noise" the output of receiver 15 is fed to a stripper 25, which may be comprised of any suitable biased amplifier whose threshold is set so that only input voltages having 27 of Fig. 2C will appear in the output. Any other type magnitude greater than that represented by dotted line of device performing the same function may be used. The output of stripper 25 may be amplified as desired.

Accordingly, the output will be as shown in Fig. 2D, having most of the noise removed, only the larger pulses, such as 29, still remaining. In order to remove these extraneous pulses a further amplifier and stripper 31 is used having a threshold corresponding to dotted line 33 of Fig. 2D, and the output will now be as shown in Fig. 2E, having only pulses corresponding to the actual received pulses 21.

Some noise pulses such as indicated at 24 in Fig. 2E may also occur. However, these will occur only at random times with no recurrent regularity and will have no effect on the circuits to be described, as will appear. In order to improve the wave shape of these pulses, they are then transmitted to an amplifier and clipper 35 which may be of any conventional type amplifier having its upper threshold set well below the peak input voltage, whereby the pulses 21 are clipped and made to have a steep wave front and short rise time as shown in Fig. 2F. These reformed pulses are now transmitted by way of switch 37 in its lower position to a multi-vibrator 41 of any conventional type adapted to produce its output voltage pulses of fixed duration and fixed amplitude. Multivibrator 41 is so adjusted that it is made stable at its self-oscillatory or "free-running" frequency, just slightly below the repetition frequency of the received pulses. In this way the received pulses will control multivibrator 41 to operate at their repetition frequency, and random pulses, such as noise pulses or other stray pulses, will have no effect on the output of multivibrator 41. By a suitable balancing circuit or phase shifter, if necessary, each of the output pulses of multivibrator 41 may be adjusted to begin at the instant that the re-shaped reflected pulses 21 reach the multivibrator.

The most desirable form of these output pulses is rectangular, as shown at 56 in Fig. 2G, since, as will be seen, this leads to a linear indication. However, the present invention is in no way restricted only to rectangular pulses, and, in fact, any shape of pulse may be used. The output of such a multivibrator may have its wave shape improved to more nearly approach the desirable rectangular wave shape by means of a further amplifier and clipper 43 of the same type as clipper 35, whose output is now as shown at 61 in Fig. 2H. Simultaneously either the transmitted pulse wave envelope as obtained from transmitter 5 through a suitable detector or demodulator 45, or as obtained directly from the synchronizing pulser 3, having the wave shape 20 shown in Fig. 2B, is fed to a suitable amplifier 47 and thence to a similar multivibrator 49 and amplifier and clipper 51 to produce at its output a similar rectangular or other shape wave 62 of the same amplitude and same duration as the output of clipper 43 shown in Fig. 2H, but of opposite polarity, as shown in Fig. 2I. These two waves 61 and 62 of Figs. 2H and 2I are then amplified in conventional amplifiers 53 and 55 having their outputs connected in parallel to a common load resistor 57, whereby the two waves 61 and 62 of Figs. 2H and 2I are caused to subtract from one another, the resultant appearing across output resistor 57 in the form shown at 58 and 59 in Fig. 2J.

It will be clear that the duration of, for example, the positive pulses 59 of Fig. 2J depends upon the time interval T between the transmitted pulses 20 of Fig. 2B and the received pulses 21 of Fig. 2C. Thus, if this time interval T should decrease, more of pulses 61 of Fig. 2H will be counter-balanced by the pulse 62 of Fig. 2I, leaving net output pulses 58, 59 as shown in Fig. 2J of shorter duration. Also, if this time interval T increases, less of the pulses 61 will be counter-balanced and the resulting pulses 59 will be of longer duration.

The output voltage appearing across resistor 57 is fed to a suitable stripper, such as a rectifier 63, which will pass only the positive pulses 59 and eliminate the negative pulses 58 of the wave shown in Fig. 2J. The voltage appearing across the load resistor 65 of this stripper 63 will therefore have the wave shape shown at 60 in Fig. 2K, being merely a series of unidirectional pulses whose frequency is fixed, being the repetition frequency of the transmitted pulses, and whose individual duration is directly proportional (for rectangular pulses) to th time interval T between the transmitted pulse 20 and received pulse 21, and therefore directly proportional to the distance to the distant reflecting object.

In order to give a direct measure of this time T or the distance to the distant object, the pulses shown at 60 in Fig. 2K are transmitted to a suitable smoother or filter 67 whose output will therefore be the average of the pulses 60, shown in Fig. 2K as line 69. It will be clear that the shorter the duration of these pulses 60, the smaller will be the average output 69, while the longer their duration, the higher will be the average output 69, because of the fixed repetition frequency. This average output 69 may therefore be suitably amplified in D. C. amplifier 71 and may actuate a suitable indicator 73 whose reading will then be directly proportional to and will vary linearly with the distance to the distant object to be measured.

If other than rectangular pulses 61, 62 are used, the wave derived in Fig. 2J will no longer contain pulses whose duration is exactly proportional to the time T. However, in that case, the pulses derived as in Fig. 2K will have an average value which will correspond directly but non-linearly to the time T. Such a non-linear relation may be advantageous if it is desired to expand a portion of the indicated range to obtain more sensitive and accurate indications therein.

It will be clear that the system just described effectively measures the relative phase between the transmitted and received pulses, and therefore may be used to measure the phase between any two waves.

In place of the indicator circuit 53, 55, 63, 71, 73 just described, there may be used the device shown in co-pending application Ser. No. 375,373, for Phase Angle Indicator, filed January 22, 1941, in the name of J. E. Shepherd, now Patent No. 2,370,692, dated March 6, 1945, which will yield similar indications.

It will therefore be clear that the device above described has been made substantially independent of atmospheric interference and extraneous pulses by virtue of the fact that the actual received pulse itself is not used for measuring purposes but is merely used to control suitable locally generated pulses under the control of the instant of arrival of the reflected pulse.

The system thus far described is very suitable for determining the distance to the nearest object within the field of the transmitter radiator 7. However, if a series of objects are within the field, further major pulses may be derived which it may not be possible to separate by means of the strippers and clippers described.

Thus, referring to Fig. 3, curve A corresponding to Fig. 2B illustrates again the sequence of transmitted pulses 20 while curve B, corresponding to Fig. 2C indicates a representative output of receiver 15, this output being zero during the blanked portions 19 and containing, in the situation illustrated, two major received pulses such as 21 and 22. These may correspond to two reflecting objects within the field of the radiator 7 or to an undesired multi-reflection. Passing this received wave of Fig. 3B through stripper 31 and clipper 35 will produce a wave such as shown in Fig. 3C, corresponding to Fig. 2E still having two major received pulses in each repetition period. It is impractical to differentiate between these pulses on the basis of magnitude alone as is done by the strippers and clippers, especially so if it is desired to utilize the smaller of these pulses instead of the larger.

In order to overcome this difficulty an adjustable pulse gate is provided which will pass the desired pulse and eliminate the undesired pulse. Thus, referring again to Fig. 1, the synchronizing oscillator 1 also energizes a suitable variable phase shifter 75 preferably of the type whose phase shift is controlled proportionately by the rotation of a suitable control member 77 which may cooperate with a suitable scale 79 to indicate the amount of the phase shift. This phase shifted voltage is then passed through a suitable pulse generator such as 81, of the same type as pulse generator 3, which derives in its output a wave shape similar to that shown at 83 in Fig. 3D. In this case, the position of these pulses 83 of Fig. 3D is adjustable along the time axis with respect to the transmitted pulses 20 or the received pulses 21, 22, by means of the adjustment of phase shifter 75. These pulses 83 are then passed to a multivibrator 85 of conventional design, adapted to produce in its output pulses of fixed magnitude and adjustable duration, synchronized with the input pulses 83. Such pulses are shown at 87 in Fig. 3E and their position relative to the transmitted pulse 20 or the received pulses 21, 22 is also adjustable by means of the phase shifter 75. For this type of operation, switch 37 is thrown to its upper position, whereby the output of amplifier-clipper 35 having wave shape shown in Fig. 3C is connected to one control grid 89 of a blocking amplifier 91, another of whose control grids 93 is suitably coupled to the output of multivibrator 85 having wave shape 87.

The biases on grids 89 and 93 are so adjusted that tube 91 conducts only during the duration of pulses 87, being non-conductive or blocked at all other times. Hence, by adjusting the time position of pulses 87, as by means of phase shifter 75, and by suitably adjusting the duration of these pulses, it is possible to pass only the desired reflected pulse, such as pulse 22, while suppressing the undesired pulses, such as pulse 21, irrespective of which of these pulses has greater amplitude.

There is thus provided, in effect, a gate permitting the passage of desired pulses and suppressing undesired pulses. The output of tube 91 will then have the wave shape shown at 22 in Fig. 2F, corresponding to Fig. 2F in the situation first described, and the remaining sequence of operations is similar to that described above with respect to Fig. 2G, etc.

In operation, the gate 87 may be adjusted in position to correspond roughly to the distance of a selected distant object, as indicated on scale 79. Then the accurate distance may be read from indicator 73, with the assurance that the effects of noise and other reflected pulses have been eliminated.

Also, by suitably adjusting the width of pulse 87 so as to just circumscribe the desired pulse 22, as may be indicated on a suitable cathode ray indicator, it is possible to approximately read off the time T, which is proportional to the distance to be measured, from scale 79, since the phase shift produced in phase shifter 75 is exactly the time interval T. However, the above device has the objection that it must be manually adjusted as the distance changes.

In order to avoid this difficulty, means are provided for automatically repositioning phase shifter 75 as the distance changes. Thus, as has been shown, the adjustment of phase shifter 75 is proportional to the distance to be measured and therefore would be proportional to the input to indicator 73, using rectangular multivibrator pulses. Means are therefore provided for positioning phase shifter 75 proportionately to the input to indicator 73. Thus, coupled to the control member 77 of phase shifter 75 as by shaft 76 is a suitable motor 95, shown as being of the direct current type having a field 97 permanently energized from a D. C. source such as battery 99. Also energized from battery 99 is a circular potentiometer 101 having a variable arm 103 mechanically actuated by shaft 76 but insulated therefrom.

The armature of motor 95 is supplied with a voltage which is equal to the difference between the output of D. C. amplifier 71 and the portion of potentiometer 101 includes between its variable arm 103 and its fixed grounded terminal 107. Accordingly, motor 95 will continue to run in the proper direction until the net voltage across its armature has become zero. In this position, since potentiometer 101 is linearly wound, the angle through which shaft 76 has turned will be proportional to the signal input to terminals 105, and in this way phase shifter 75 will be adjusted proportionately to the time T or the distance to be measured. Hence, the gate provided by pulses 87 is automatically repositioned to maintain it centralized with respect to its desired received pulse 22.

It will be clear that any other suitable type of control device may be used in place of motor 95 and its associated circuits for producing the same function. In addition, if phase shifter 75 should have a non-linear variation of phase shift with respect to rotation of its control shaft 76, potentiometer 101 may be provided with a similar non-linear variation of resistance and in this way phase shifter 75 may be properly actuated despite its non-linear characteristics.

If desired, the mechanical control of phase shifter 75 may be replaced by a suitable electrical control, which may be of the type shown in copending application Serial No. 434,403, for Pulse Receiving System, filed March 12, 1942, in the name of H. M. Stearns.

In operation, the operator will normally throw switch 37 to the down position. If the received pulses are ambiguous or indeterminate, as may be indicated by a suitable cathode ray indicator connected to the output of receiver 15, switch 37 may be thrown to the upper position and phase shifter 75 adjusted to the approximate range or distance of the object it is desired to indicate. Multivibrator 85 is then adjusted so that the duration of its output pulses is short enough to eliminate any undesired pulses, as may be evidenced by a suitable indicator connected to the output of tube 91. Thereafter the system will automatically operate to indicate the desired distance, while substantially eliminating all undesired interfering pulses.

It will be clear that suitable phase shifters or time delay devices may be inserted at various points of the circuit to insure the relationship stated among the various pulses and wave shapes.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A radio noise-reducing system operating to eliminate noise that is displaced in time with respect to received pulse signals, comprising means for producing gate signals having substantially the same duration as said received signals, utilization means activated by said gate signals for responding to said received signals, delaying means for adjusting the relative time position of said gate and received signals, and servo motive means for controlling said delaying means in response to the time position of said received signals.

2. A radio system comprising means for transmitting periodic pulse signals, means for receiving said signals after a time delay, a self oscillator for producing waves of a frequency substantially the same as said received signals, means for generating gate signals having substantially the same duration as said received signals, means activated by said gate signals for synchronizing the phase of said self-oscillator waves to that of said received signals, phase shifting means for adjusting the relative time position of said gate and received signals, and means controlling said phase shifting means in accordance with the time position of said self-oscillator waves for maintaining said gate and received signals concurrent.

3. A radio noise-reducing system operating to eliminate noise that is displaced in time with respect to received pulse signals, comprising a self oscillator for producing waves having a frequency substantially the same as said received signals, means for generating gate signals having substantially the same duration as said received signals, controlling means activated by said gate signals for synchronizing the phase of said self-oscillator waves to that of said received signals, phase shifting means for adjusting the relative time phase of said received signals and said gate signals, and servo motive means controlling said phase shifting means in response to the time position of said self-oscillator waves for maintaining said gate signals concurrent with said received signals.

4. A distance measuring radio system comprising means for radiating periodic pulse signals, means for receiving said signals after reflection from an object, a self oscillator for producing waves of a frequency substantially the same as said pulses, means for generating gate signals having substantially the same duration as said pulses, controlling means activated by said gate signals for synchronizing the phase of said self-oscillator waves to that of said received signals, delaying means for adjusting the relative time phase of said gate and received signals, phase measuring means for measuring the phase difference between said self-oscillator waves and said radiated pulse signals, and servo motive means controlling said phase shifting means in response to said phase measuring means for maintaining said gate signals concurrent with said received pulse signals.

5. A radio noise-reducing system operating to eliminate noise that is displaced in time with respect to received pulse signals, comprising means for producing gate signals having substantially the same duration as said received signals, utilization means activated by said gate signals for responding to said received signals, phase shifting means for adjusting the relative time position of said gate and received signals, and servo motive means for controlling said phase shifting means in response to the time position of said received signals.

6. A radio system comprising means for transmitting periodic pulse signals, means for receiving said signals after a time delay, a self oscillator for producing waves of a frequency substantially the same as said received signals, means for generating gate signals having substantially the same duration as said received signals, means activated by said gate signals for synchronizing the phase of said self-oscillator waves to that of said received signals, delaying means for adjusting the relative time position of said gate and received signals, and means controlling said delaying means in accordance with the time position of said self-oscillator waves for maintaining said gate and received signals concurrent.

References Cited in the file of this patent

UNITED STATES PATENTS

| | | |
|---|---|---|
| 2,039,267 | Barber | Apr. 28, 1936 |
| 2,055,883 | Terry | Sept. 29, 1936 |
| 2,140,016 | Kautter | Dec. 13, 1938 |
| 2,147,729 | Wurmser | Feb. 21, 1939 |
| 2,157,677 | Runge | May 9, 1939 |
| 2,208,378 | Luck | July 16, 1940 |
| 2,223,840 | Wolf | Dec. 3, 1940 |
| 2,226,459 | Bingley | Dec. 24, 1940 |
| 2,227,598 | Lyman et al. | Jan. 7, 1941 |
| 2,281,995 | Purington | May 5, 1942 |
| 2,284,747 | Koch | June 2, 1942 |
| 2,287,174 | Heising | June 23, 1942 |